Figure 1:
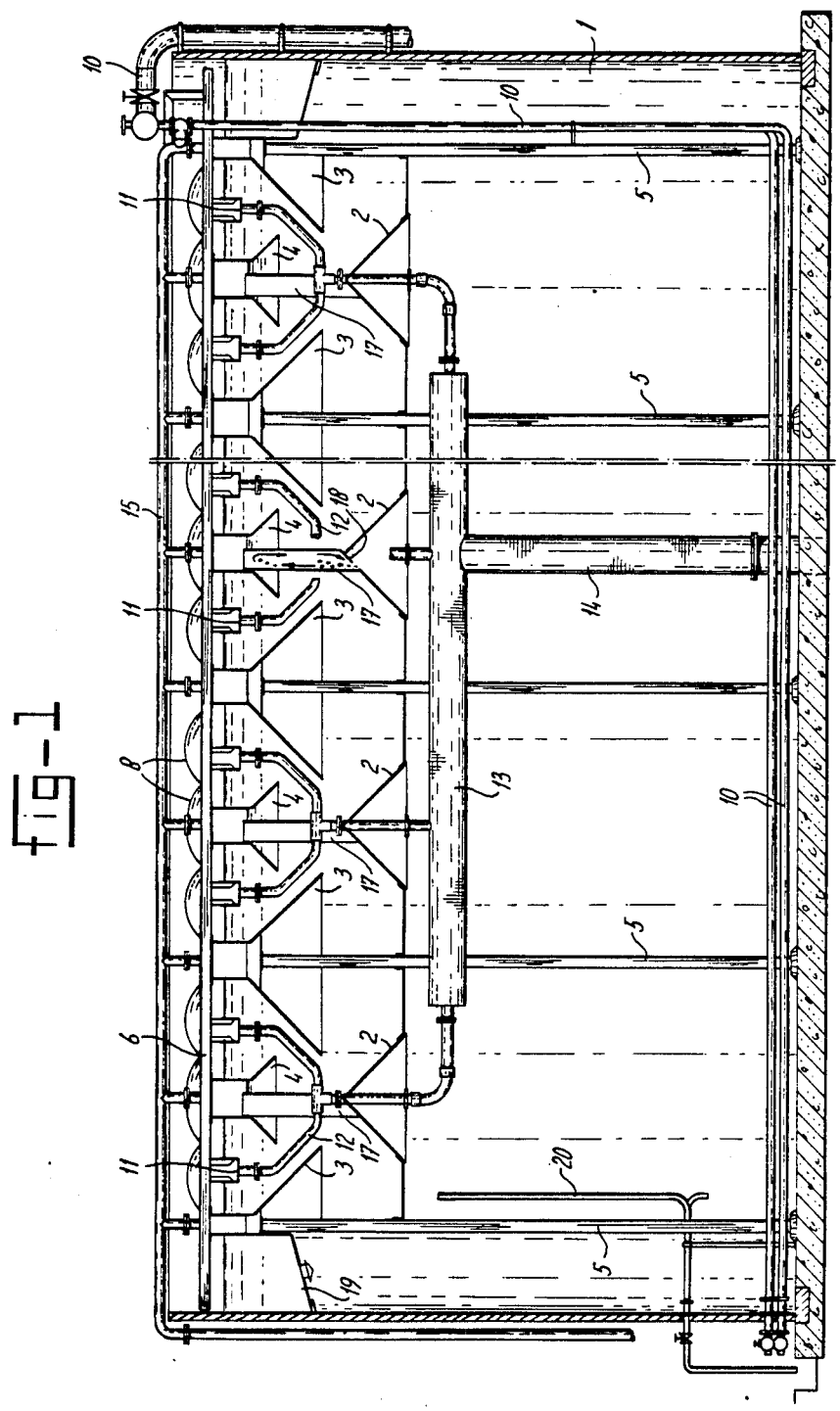

United States Patent [19]

Vellinga

[11] Patent Number: 4,622,147
[45] Date of Patent: Nov. 11, 1986

[54] PLANT FOR THE ANAEROBIC PURIFICATION OF WASTE WATER

[75] Inventor: Sjoerd H. J. Vellinga, Wommels, Netherlands

[73] Assignee: Paques B.V., Balk, Netherlands

[21] Appl. No.: 835,794

[22] Filed: Mar. 3, 1986

[30] Foreign Application Priority Data

Mar. 6, 1985 [NL] Netherlands .................... 8500634

[51] Int. Cl.$^4$ ............................................ B01D 21/02
[52] U.S. Cl. .................................................... 210/539
[58] Field of Search ............... 210/603, 180, 538–540, 210/521

[56] References Cited

U.S. PATENT DOCUMENTS

| | | | |
|---|---|---|---|
| 3,279,606 | 10/1966 | Cox | 210/539 X |
| 3,767,051 | 10/1973 | Thompson | 210/539 X |
| 4,253,956 | 3/1981 | Pette | 210/539 X |
| 4,401,441 | 8/1983 | Chase | 210/180 X |

FOREIGN PATENT DOCUMENTS 571967 2/1924 France.
833184 10/1938 France.

*Primary Examiner*—Tom Wyse
*Attorney, Agent, or Firm*—Dennison, Meserole, Pollack & Scheiner

[57] ABSTRACT

In order to achieve an essentially turbulence-free zone near the means (11) for the discharge of purified water in an anaerobic purification plant for waste water with a fermentation chamber, a settler disposed above the latter and the said discharge means (11) disposed above the settler, the settler consists of three levels of gas-collection hoods (2, 3, 4), each gas-collection hood of the uppermost level (4) being sited directly above a gas-collection hood of the lowermost level (2), each gas-collection hood of the lowermost level (2) being connected via one or more pipes with a gas-collection hood of the uppermost level (4), and the gas-collection hoods of the uppermost and middle level (4 or 3 respectively) having a direct connection to the gas-discharge line (15).

4 Claims, 2 Drawing Figures

PLANT FOR THE ANAEROBIC PURIFICATION OF WASTE WATER

The invention relates to a plant for the anaerobic purification of waste water comprising a reactor tank with a settler disposed above a fermentation chamber, the settler being formed by at least two levels of gas-collection hoods which are sited in an overlapping manner such that gas bubbles rising up out of the fermentation chamber are always collected, means for the discharge of purified water disposed above the gas-collection hoods, and means for the supply of waste water to the fermentation chamber.

A plant of this type is in practice often described by the term U.A.S.B. reactor, U.A.S.B. standing for "Upflow Anaerobic Sludge Blanket". The settler of known plants of the abovenamed type consists of two levels of gas-collection hoods; each hood of the lowermost level is connected by a sloping pipe to a hood of the uppermost level. All the gas collected flows out of the hoods of the uppermost level to a gas-discharge line which is, for example, connected to a gasometer. This known type of waste-water purification installation exhibits the disadvantage that as a result of turbulence sludge and water are inadequately separated from each other in the settler, which has a disadvantageous influence on the yield of the installation. This turbulence is generated, inter alia, because upward flows are produced in the settler which are generated by minute small gas bubbles. These small gas bubbles are produced because water at greater depth can contain more gas in solution than water at the surface. During upward flow this oversaturation of gas will egress from the water in the form of small bubbles. Once a flow of this type has been produced, it maintains itself because it starts to act as a gas lift and collects water from greater depth. This has the result that excessively large vertical and horizontal flows (from ascending to descending current) are produced in the settler.

The object of the invention is to eliminate this disadvantage and to provide an anaerobic purification installation of the type named in the introduction in which at least the zone near the means for the discharge of purified water is free of turbulence and consequeptly the separation between sludge and water is ideal.

According to the invention the plant is characterized in that the settler consists of three levels of gas-collection hoods, each gas-collection hood of the uppermost level being sited directly above a gas-collection hood of the lowermost level, in that each gas-collection hood of the lowermost level is connected via one or more pipes with a gas-collection hood of the uppermost level, and in that the gas-collection hoods of the uppermost and middle levels have a direct connection to the gas-discharge line.

The only permitted flow is the flow of the effluent; gas bubbles liberated as a result of decreasing pressure are collected by the uppermost level of gas hoods and cannot disturb the settling of sludge. The additional level of gas-collection hoods leads to an improvement of the gas collection and consequently to a reduction of any odour nuisance. A better deceleration of horizontal flow is also achieved, The gas collected in the lowermost level of gas-collection hoods should be delivered in a controlled manner to the gas discharge and not be released in the uppermost liquid layer. For that reason the gas-collection hoods of the uppermost and middle levels have a direct connection to the gas discharge line while the gas-connection hoods of the lowermost level each have a gas connection to a gas-collection hood of the uppermost level.

To prevent the possibility that the gas originating from the lowermost hoods might generate turbulences in the liquid located in the uppermost hood, it is preferable that the gas connection between the hood of the lowermost and a hood of the uppermost level consists of a vertical riser pipe which debouches above the liquid level which is maintained in the uppermost hoods during operation.

The vertical connection pipes between the gas-collection hoods of the lowermost level and those of the uppermost level are of a cross-section such that these pipes cannot act as a gas lift, and the inlet of the gas is also arranged in a manner such that a circulation is produced in the said vertical pipe which prevents an excessive floating layer being produced in it.

The gas is removed from the lowermost gas hoods in a manner such that a gas channel is produced in the the of the hood so that no water flows are produced in the longitudinal direction by the transport of the gas to the discharge point.

In order to achieve a good separation between liquid and gas in the vertical connection pipes between the gas-collection hoods of the lowermost level and those of the uppermost level, the vertical riser pipes may be restricted at the bottom end by an inclined guide plate.

A drawback of known U.A.S.B. reactors is, moreover, that the gas-collection hoods have the same length and the square settler is sited inside the circular crosssection of the reactor tank. This construction requires inclined guide baffles which collect the gas rising outside the settler and convey it to the settler.

This gas generates horizontal flows which may disturb the settling.

It is intended to eliminate this drawback and for this purpose the gas-collection hoods extend at both ends to near the cylindrical wall of the tank.

The enlarging of the settler by the extension of the gas-collection hoods results, in addition, in an improvement of the yield per square metre surface of the installation.

The invention will now be explained in more detail by reference to the figures in which an exemplary embodiment is shown.

Figure 2:
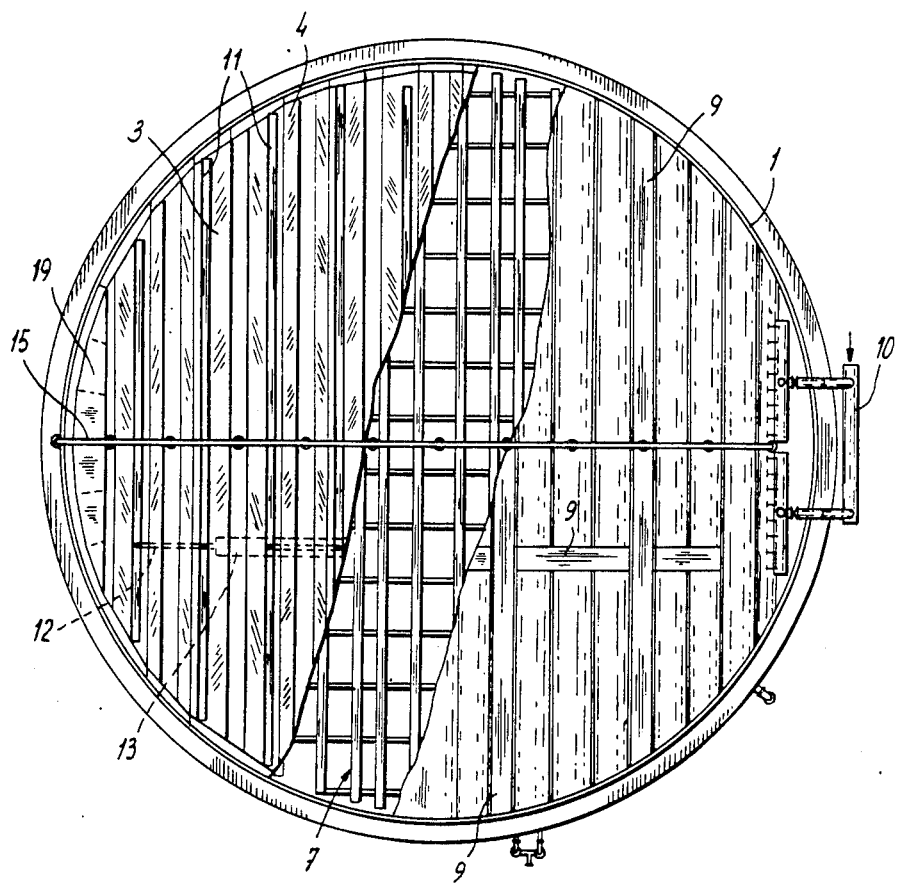

FIG. 1 shows an axial section, and
FIG. 2 shows a cross-section of an anaerobic waste-water purification installation.

The plant shown comprises a cylindrical tank 1, in the upper section of which a settler is sited which is formed by three levels of gas-collection hoods. The hoods of the lowermost level are indicated by 2, those of the middle level by 3 and those of the uppermost level by 4. Each hood 4 of the uppermost level is directly above a hood 2 of the lowermost level. The hoods 2 of the lowermost level overlap the hoods 3 of the middle level.

A system of pillars 5, crossbeams 6 and supporting beams 7 which cross each other cater for the supporting of the collection hoods.

The top of the tank 1 is covered with a system of long curved plastic-material hoods 8 and runways 9. This system rests on the supporting beams 7 which cross each other. Overflow ducts 11 for purified water are disposed between the gas-collection hoods 3 and 4. These ducts 11 are connected via connection pipes 12 to the main discharge pipes 13 and 14.

The gas-collection hoods 3 and 4 of the middle and highest level respectively have a direct connection to a main discharge pipe 15 for gas which leads, for example, to a gasometer. The gas-collection hood 2 of the lowermost level is also connected via a vertical riser pipe 17 to a gas-collection hood 4 of the highest level.

The plant operates as follows:

A layer of anaerobic sludge is disposed on the bottom of the tank. Waste water is supplied to the tank in a well distributed manner via a supply system 10. The organic material is converted by anaerobic fermentation into methane which partially dissolves in the water and partially rises in the form of gas bubbles. The liquid level rises as a result of the waste water supplied until the level of the overflow edge of the ducts 11 is reached. The purified water flows into the said ducts and is discharged via the lines 12, 13 and 14. The rising gas is collected in the gas-collection hoods 2, 3 and 4. The gas in the hoods 3 and 4 will flow directly into the gas discharge pipe 15, while the gas in the lowermost hoods 2 is fed via the vertical riser pipes 17 into the uppermost hoods 4 and from there into the gas discharge pipe 15.

The gas discharge in the pipe 15 is adjusted in a manner such that the liquid level in the hoods 3 and 4 is lower than the general liquid level which is determined by the height of the overflow edge of the ducts 11. Care is taken to ensure that the upper edge of the vertical pipes 17 project above the lowered liquid level in the uppermost hoods 4, as a result of which the liquid in the hoods 4 cannot become turbulent.

Because the bottom of the pipes 17 is provided with a restriction in the form of an inclined guide plate 18, the sludge which has settled inside the pipes can flow back along the guide plates 18 in the direction of the fermentation zone. It is important that the water flows towards the overflow ducts without turbulences. Only then is a good separation between the purified water and the entrained sludge particles achieved. The precipitated sludge ends up on the upper faces of the gas-collection hoods 2, 3 and 4, and slides downwards along these faces in the direction of the fermentation chamber below the settler. To effect a turbulence-free water flow it is of considerable importance according to the invention that the settler consists of three levels of gas-collection hoods. The uppermost collection hoods serve to collect the gas which is liberated as a result of the oversaturation and to prevent the turbulence which is produced by these minute gas bubbles penetrating into the settling zone itself. Within the pipes 17 a circulation flow is brought about with a rising, gas-containing current on one side and a descending, gas-free water/sludge current on the other side. This circulation is limited to the inside of the pipes 17 because the debouching of the pipes 17 is above the liquid level.

Should a floating layer have formed inside the hoods 4, it can be broken up by reducing the gas pressure to a value at which the upper edge of the pipes 17 is below the liquid level.

The settler shown is constructed of straight gas-collection hoods. In small reactors round, concentric hoods may be considered. The straight hoods extend to the circumferential edge of the tank. This means that the surface of the guide baffles (such as 19 in the figures) which are arranged next to the settler inside the tank can be limited to a minimum. These baffles have the disadvantage that they convey the gas in the horizontal direction and that the horizontal currents generated as a result of this disturb the settling. In addition, for a certain reactor surface area and a larger settling surface area the gas load ($m^3$ of gas/$m^2$/h) and the hydraulic load ($m^3$ of effluent/$m^2$/h) are reduced, which results in a larger maximum loading of the reactor.

Within the scope of the claims various modifications of the plant shown and described are possible.

I claim:

1. Plant for the anaerobic purification of waste water comprising a reactor tank with a settler disposed above a fermentation chamber, the settler being formed by at least two levels of gas-collection hoods which are sited in an overlapping manner such that the gas bubbles rising up out of the fermentation chamber are always collected, means for the discharge of purified water disposed above the gas collection hoods, and means for the supply of waste water to the fermentation chamber, characterized in that the settler consists of three levels of gas-collection hoods (2, 3, 4), each gas-collection hood of the uppermost level (4) being sited directly above a gas-collection hood of the lowermost level (2), in that each gas-collection hood of the lowermost layer (2) is connected via one or more pipes to a gas-collection hood of the uppermost level (4), and in that the gas-collection hoods of the uppermost and middle level (4 and 3 respectively) have a direct connection to the gas discharge line (15).

2. Plant according to claim 1, characterized in that the gas connection between a hood (2) of the lowermost and a hood (4) of the uppermost level consist of a vertical riser pipe (17) which debouches above the liquid level which is maintained in the riser pipe during operation.

3. Plant according to claim 2, characterized in that the vertical riser pipes (17) are restricted at the bottom end by an inclined guide plate (18).

4. Plant according to one of the preceding claims having a cylindrical tank with straight gas-collection hoods, characterized in that the gas-collection hoods (2, 3, 4) extend at both ends to near the walls of the tank.

* * * * *